(12) United States Patent
Fliearman et al.

(10) Patent No.: US 11,820,223 B2
(45) Date of Patent: Nov. 21, 2023

(54) TANDEM WHEEL ASSEMBLY WITH REACTION DOWNFORCE CENTER PIVOT

(71) Applicant: Deere & Company, Moline, IL (US)

(72) Inventors: Steven R. Fliearman, Coffeyville, KS (US); Prashant Shinde, Pune (IN)

(73) Assignee: DEERE & COMPANY, Moline, IL (US)

( * ) Notice: Subject to any disclaimer, the term of this patent is extended or adjusted under 35 U.S.C. 154(b) by 160 days.

(21) Appl. No.: 17/068,159

(22) Filed: Oct. 12, 2020

(65) Prior Publication Data

US 2022/0111726 A1 Apr. 14, 2022

(51) Int. Cl.
*B60K 17/36* (2006.01)
*B60K 17/04* (2006.01)
*B60K 17/342* (2006.01)

(52) U.S. Cl.
CPC .......... *B60K 17/046* (2013.01); *B60K 17/342* (2013.01); *B60K 17/36* (2013.01)

(58) Field of Classification Search
CPC ..................................................... B60K 17/36
See application file for complete search history.

(56) References Cited

U.S. PATENT DOCUMENTS

| | | | |
|---|---|---|---|
| 2,374,196 A | 2/1942 | Harbers | |
| 2,819,910 A | 1/1958 | Walter | |
| 3,166,142 A | 1/1965 | Frazier | |
| 3,198,551 A | 8/1965 | Garner | |
| 3,450,221 A | 6/1969 | Nelson | |
| 3,786,888 A | 1/1974 | Nelson | |
| 3,792,871 A | 2/1974 | Chalmers | |
| 3,976,154 A | 8/1976 | Clark et al. | |
| 4,064,956 A | 12/1977 | Wildey | |
| 4,237,994 A | 12/1980 | McColl | |

(Continued)

FOREIGN PATENT DOCUMENTS

| | | |
|---|---|---|
| CN | 201192987 Y | 2/2009 |
| CN | 110217103 A | 9/2019 |

(Continued)

OTHER PUBLICATIONS

German Search Report issued in application No. DE102021203728.3 dated Feb. 14, 2022 (06 pages).

(Continued)

*Primary Examiner* — Barry Gooden, Jr.
(74) *Attorney, Agent, or Firm* — KLINTWORTH & ROZENBLAT IP LLP (57) ABSTRACT

A tandem wheel assembly includes a tandem wheel housing having a center opening extending along a pivot axis, and wheel end openings extending along associated wheel axes. A pivot cage is configured to fixedly mount to a chassis of a vehicle and is disposed about the pivot axis at the center opening. A center sprocket is disposed within and rotatable with respect to the pivot cage. A wheel end assembly is disposed at each wheel end opening and has a wheel end sprocket, a wheel end gear train, and a wheel end hub. Each wheel end gear train is coupled for rotation by the wheel end sprocket and rotates the wheel end hub about the wheel end axis. A pair of reaction bars are pivotally coupled to the pivot cage at one end and to a component of the wheel end gear train at the other end.

19 Claims, 9 Drawing Sheets

(56) References Cited

U.S. PATENT DOCUMENTS

| | | |
|---|---|---|
| 4,278,141 A | 7/1981 | Oswald et al. |
| 4,407,381 A | 10/1983 | Oswald et al. |
| 4,535,860 A | 8/1985 | Waggoner |
| 4,560,018 A | 12/1985 | Satzler |
| 4,646,880 A | 3/1987 | Logan |
| 5,016,905 A | 5/1991 | Licari |
| 5,337,849 A | 8/1994 | Eavenson, Sr. et al. |
| 5,417,297 A | 5/1995 | Auer |
| 6,036,611 A | 3/2000 | Bigo et al. |
| 6,112,843 A | 9/2000 | Wilcox et al. |
| 6,200,240 B1 | 3/2001 | Oates |
| 6,416,136 B1 | 7/2002 | Smith |
| 7,124,853 B1 | 10/2006 | Kole, Jr. |
| 7,229,094 B2 | 6/2007 | Miller et al. |
| 7,296,642 B1 | 11/2007 | DeWald |
| 7,832,509 B2 * | 11/2010 | Thomson .............. B60K 17/36 180/65.6 |
| 7,954,574 B2 | 6/2011 | Schoon |
| 8,262,125 B2 | 9/2012 | Sergison et al. |
| 8,733,489 B2 | 5/2014 | Heine et al. |
| 9,242,556 B2 | 1/2016 | Ziech et al. |
| 9,358,880 B2 | 6/2016 | Bindl |
| 9,868,322 B1 | 1/2018 | Varela |
| 10,106,010 B2 | 10/2018 | Fliearman |
| 10,107,363 B2 | 10/2018 | Fliearman et al. |
| 10,207,580 B2 | 2/2019 | Long et al. |
| 10,434,836 B2 | 10/2019 | Fliearman |
| 11,376,956 B2 * | 7/2022 | Fliearman ............ B60G 17/005 |
| 2005/0045390 A1 | 3/2005 | Lamela et al. |
| 2005/0279563 A1 | 12/2005 | Peterson |
| 2006/0154776 A1 | 7/2006 | Claussen et al. |
| 2008/0230284 A1 | 9/2008 | Schoon |
| 2010/0012401 A1 * | 1/2010 | Thomson .............. B60K 17/36 180/24.11 |
| 2014/0145410 A1 | 5/2014 | Kaufman et al. |
| 2015/0165898 A1 * | 6/2015 | Bindl .................... B60K 17/36 180/248 |
| 2016/0178041 A1 * | 6/2016 | Hagman .............. B60K 17/046 475/204 |
| 2016/0263987 A1 | 9/2016 | Brownell et al. |
| 2017/0050517 A1 | 2/2017 | Higuchi |
| 2017/0080752 A1 * | 3/2017 | Varela .................... F16H 48/10 |
| 2018/0065439 A1 | 3/2018 | Fliearman |
| 2018/0065440 A1 | 3/2018 | Fliearman |
| 2018/0312060 A1 * | 11/2018 | Varela .................. B60K 17/165 |
| 2019/0001772 A1 | 1/2019 | Dyna |
| 2019/0331173 A1 | 10/2019 | Eschenburg et al. |
| 2020/0400226 A1 * | 12/2020 | Shinde ................ F16H 57/0443 |
| 2022/0118848 A1 * | 4/2022 | Fliearman ............ F16H 37/065 |
| 2022/0340005 A1 * | 10/2022 | Fliearman ............ B60K 17/36 |

FOREIGN PATENT DOCUMENTS

| | | |
|---|---|---|
| DE | 19681259 C2 | 6/2000 |
| DE | 19908958 A1 | 9/2000 |
| GB | 567097 A | 1/1945 |
| GB | 1576166 A | 10/1980 |
| WO | WO2012123630 A1 | 9/2012 |
| WO | 2016170410 A1 | 10/2016 |

OTHER PUBLICATIONS

German Search Report issued in application No. DE102021207440.5 dated Mar. 17, 2022 (17 pages).
John Deere, 317 and 320 Skid Steers, Introduction and Customer Information, T198465A A.1, Manufactured 2004-2009.
John Deere, 317 and 320 Skid Steers PC9347 Parts List—50 Power Train, undated, admitted prior art.
John Deere, Drive Chains and Sprockets—ST119001, 317 and 320 Skid Steers PC9347-50 Power Train Parts List, undated, admitted prior art.
John Deere, Axle ST119002, 317 and 320 Skid Steers PC9347-50 Power Train Parts List, undated, admitted prior art.
John Deere, Image of Fixed Axle Drive, undated, admitted prior art.
Tigercat, H-Series Skidders, 620H | 630H | 632H | 625H | 635H Brochure © 2001-2020.
Tigercat Bogie Skidder Image, undated admitted prior art.
NAF Bogie Axles For Your Heavy Duty Playgrounds Brochure, 2019.
European Extended Search Report for U.S. Appl. No. 17/184,539 dated Jan. 10, 2018.
USPTO Ex Parte Quayle Action for U.S. Appl. No. 15/255,860 issued Apr. 5, 2018.
German Search Report issued in application No. DE102021209187.3 dated Mar. 29, 2022 (10 pages).
USPTO Non-Final Office Action issued in utility U.S. Appl. No. 17/075,144 dated Oct. 18, 2021.
USPTO Non-Final Office Action issued in utility U.S. Appl. No. 17/186,516 dated Oct. 14, 2022.
USPTO Non-Final Office Action issued in Utility U.S. Appl. No. 17/236,126 dated Mar. 31, 2023.
German Search Report issued in application No. DE102022202294.7 dated Oct. 13, 2022 with translation (21 pages).
USPTO Non-Final Office Action issued in Utility U.S. Appl. No. 16/852,117 dated Apr. 20, 2023.
Utility U.S. Appl. No. 16/852,117, filed Apr. 17, 2020.
USPTO Final Office Action issued in U.S. Appl. No. 16/852,117 dated Sep. 21, 2023.

* cited by examiner

TANDEM WHEEL ASSEMBLY WITH REACTION DOWNFORCE CENTER PIVOT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more particularly, to tandem wheel assemblies for work vehicles.

BACKGROUND OF THE DISCLOSURE

Work vehicles, such as used in forestry, construction, agriculture, mining and other industries, may utilize tandem wheel assemblies (also known as bogie axles) to support significant loads across four or more ground-engaging or track wheels utilizing a single axle that allows the wheels pivot together to maintain ground contact over varying terrain without significantly shifting other areas of the work vehicle, including an operator cabin and a work implement (e.g., a crane). Such tandem wheel assemblies may also be driven (e.g., from the work vehicle powertrain through a transmission or may be powered themselves). One work vehicle that often utilizes a tandem wheel assembly is a forwarder used in tree harvesting operations. Applications may require the forwarder to deliver high-torque, and possibly low-speed, power to the ground-engaging wheels, which is achieved through a high-ratio gear reduction to the wheels. Different applications may be suitable for different forwarders or other machine platforms with different load-carrying capabilities.

SUMMARY OF THE DISCLOSURE

The disclosure provides a work vehicle tandem wheel assembly with a center pivot cage with reaction bars to effect downforce on the wheels.

In one aspect, the disclosure provides a provides a tandem wheel assembly having for a work vehicle having a chassis and wheels. The tandem wheel assembly includes a tandem wheel housing having an inboard wall and an outboard wall both defining, at least in part, an interior, the inboard wall and the outboard wall both defining a center opening extending along a pivot axis and wheel end openings extending along associated wheel axes. A pivot cage is configured to fixedly mount to the chassis and disposed about the pivot axis at the center opening of the tandem wheel housing. The pivot cage has an annular body extending between an inboard end and an outboard end. The inboard wall and the outboard wall of the tandem wheel housing is pivotally mounted to the pivot cage at, respectively, the inboard end and the outboard end of the annular body. A center sprocket is disposed within and rotatable with respect to the pivot cage. A wheel end assembly is disposed at each of the wheel end openings. Each wheel end assembly has a wheel end sprocket, a wheel end gear train, and a wheel end hub, each wheel end sprocket being supported within the tandem wheel housing for rotation by at least one chain coupled to the center sprocket. Each wheel end gear train is coupled for rotation by the associated wheel end sprocket and configured to effect a gear ratio change and rotate the associated wheel end hub about the associated wheel end axis. A pair of reaction bars are included with which each reaction bar being pivotally coupled at one end to the annular body of the pivot cage and at an opposite end to a component of the wheel end gear train.

In another aspect, the disclosure provides a tandem wheel assembly for a work vehicle having a chassis and wheels. The tandem wheel assembly includes a tandem wheel housing having an inboard wall and an outboard wall both defining, at least in part, an interior, the inboard wall and the outboard wall both defining a center opening extending along a pivot axis and wheel end openings extending along associated wheel axes. A pivot cage is configured to fixedly mount to the chassis and disposed about the pivot axis at the center opening of the tandem wheel housing. The pivot cage has an annular body extending between an inboard end and an outboard end. The inboard wall and the outboard wall of the tandem wheel housing are pivotally mounted to the pivot cage at, respectively, the inboard end and the outboard end of the annular body. A center sprocket is disposed within and rotatable with respect to the pivot cage. A wheel end assembly is disposed at each wheel end opening. Each wheel end assembly has a wheel end sprocket, a wheel end gear train, and a wheel end hub, each wheel end sprocket being supported within the tandem wheel housing for rotation by at least one chain coupled to the center sprocket. Each wheel end gear train is coupled for rotation by the associated wheel end sprocket and configured to effect a gear ratio change and rotate the associated wheel end hub about the associated wheel end axis. Reaction bars extend within the interior of the tandem wheel housing. Each reaction bar is pivotally coupled at one end to the annular body of the pivot cage and at an opposite end to a component of the wheel end gear train.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed tandem wheel assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "longitudinal," "inner," "outer," "radial," "axial," "circumferential," "lateral," and "transverse" may be used. Such terms are defined, at least in part, with respect to a wheel axle, pivot axis, and/or a work vehicle. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. In other examples, the components referenced by those terms may be reversed in accordance with the present disclosure.

Overview

Work vehicles, such as tree harvesting forwarders, typically include components such as a chassis, power train (e.g., engine and drivetrain), suspension, and work implements (e.g., cranes) that implement tasks over a variety of terrain and conditions. Typically, the work vehicle may perform tasks that require consistent work implement positioning (e.g., crane grasping and moving felled trees). The wheel axle region may support significant static weight loads from on-board components (e.g., engine, transmission, axle, work implements, etc.) and encounter significant operating loads (e.g., via attached work implements and shocks/loads through the wheels and suspension). Therefore, the work vehicle must accommodate varying terrain, static loads, and operating loads resulting from the work tasks while maintaining the desired implement positioning. A tandem wheel assembly may accommodate such loads or changes in grade by mounting wheel assemblies, typically rear wheel assemblies, together to pivot relative to the work vehicle, providing ground contact for the wheel without significantly hindering work implement placement.

In the case of a forwarder, the work implement is typically a crane, which, during operation, lifts large felled trees onto a load space of the forwarder. The forwarder carries quantities of felled trees and must travel at sufficient speed to be productive while preventing unwanted bouncing and rocking; for example, a forwarder may work at a speed range from slow speeds (e.g., 1-10 miles per hour (mph)) to higher speed ranges (e.g., 40 mph or more during transport and other operating states). During use, the forwarder experiences load forces in the weight of the felled trees and shocks from ground obstacles encountered during travel. The corresponding operating loads are transferred to and through the chassis and drivetrain to the vehicle wheels, which transfer the load to the ground surface. Accordingly, the drivetrain and wheels can contribute to performance of the forwarder by maintaining ground contact for consistent traction.

This disclosure provides a tandem wheel assembly having a pivot cage non-rotationally fixed to the chassis of the vehicle which is nested or seated within a tandem wheel housing of the tandem wheel assembly that mounts a set of tandem wheels. Bushings are provided at inboard and outboard positions between the pivot cage and the tandem wheel housing and inboard and outboard of a center sprocket which improves the overall turning moment which extends through the bushings. In addition, the ground pushing upwardly on the wheels causes moments to be formed at the outward ends of the tandem wheel housing and by providing the outboard bushing, which is more in line with the wheels, reduces the moment arm which decreases the moments formed at the outward ends of the tandem wheel housing to improve the overall load capabilities.

This disclosure provides a tandem wheel assembly configured to provide improved downforce distribution to a set of tandem wheels during operation of a work vehicle, especially during acceleration and deceleration of the work vehicle in which the disclosed arrangement may respond to input torque changes with reactive forces or moments to maintain both wheels into engagement with the ground. The tandem wheel assembly distributes torque between the wheel ends with reaction bars coupled to the pivot cage.

The following describes one or more example implementations of the disclosed tandem wheel housing. While discussion herein may sometimes focus on the example application of a tandem wheel assembly of a tree harvesting forwarder, the disclosed tandem wheel assembly may also be applicable to bogie axles or tandem axles in other types of work vehicles, including self-propelled or towed work vehicles, as well as various other agricultural machines (e.g., articulated tractors, utility tractors, motor graders, front end loaders, harvesters and the like), various construction and forestry machines (e.g., skidders and so on), and transportation vehicles (e.g., semi-trailers).

Example Embodiments of the Tandem Wheel Assembly

Figure 1:
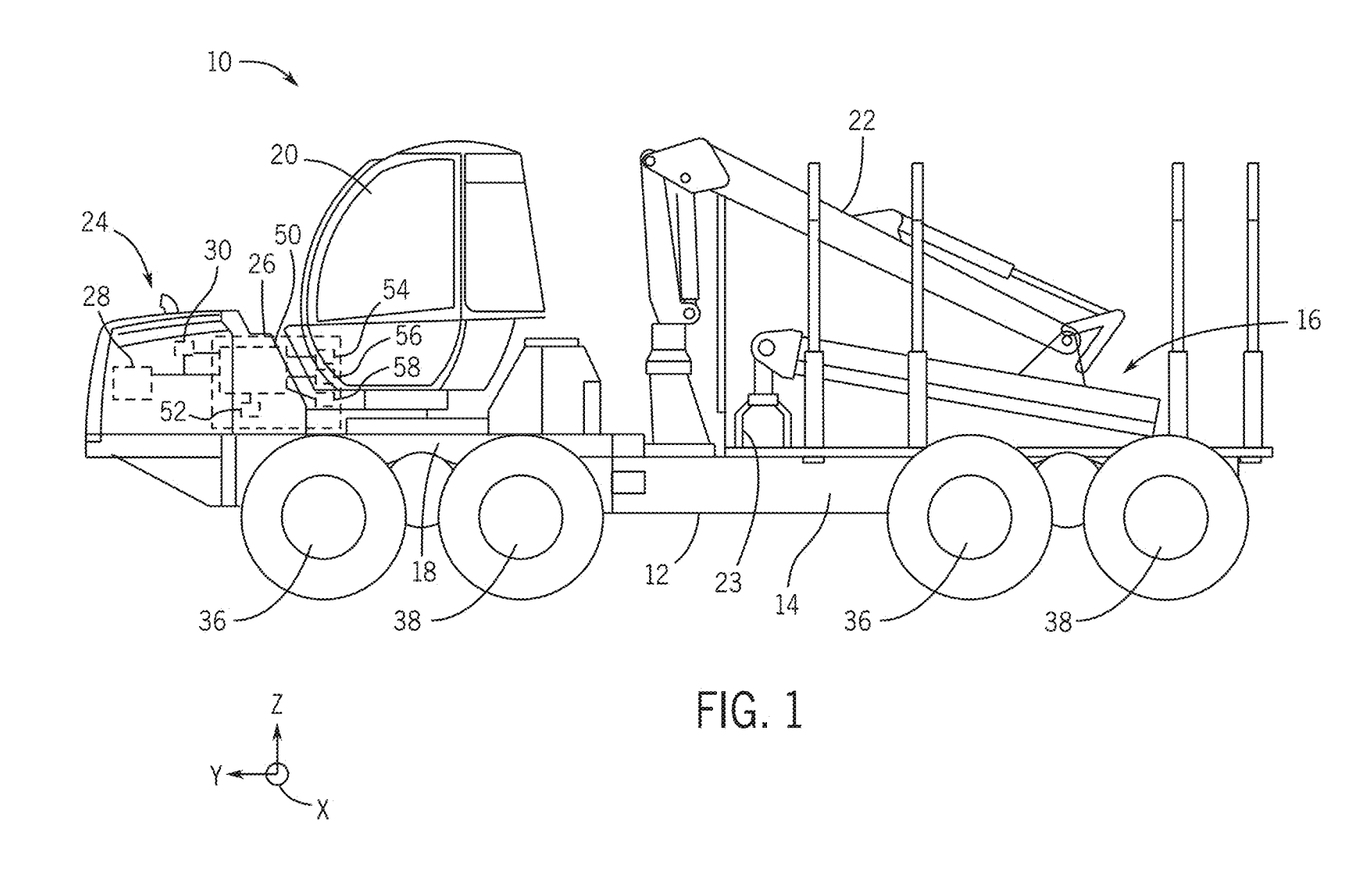
FIG. 1 is a simplified perspective view of an example work vehicle in the form of a tree harvesting forwarder in which a tandem wheel assembly in accordance with this disclosure may be used.

Referring to FIG. 1, in some embodiments, the disclosed work vehicle 10 may be a tree harvesting forwarder, although, as noted, the tandem wheel described herein may be applicable to a variety of machines, such as motor graders, skidders, other construction vehicles, agricultural vehicles including articulated-frame tractors, other forestry vehicles, and transportation vehicles such as semi-trailers. As shown, the work vehicle 10 may be considered to include a chassis 12 constituted by a rear frame 14 having a load space 16 formed for the transportation of the felled trees and a front frame 18 having an operator cabin 20. The rear frame 14 and the front frame 18 may be connected by an articulated joint. A crane 22, intended for the manipulation of felled trees into the load space 16, is mounted to the rear frame 14 rearward of the operator cabin 20. At the head of the crane 22, a loading grapple 23 is provided, equipped with gripping members known as such, which are turned towards or away from each other by an actuator provided in them, wherein the loading grapple 23 can be used for gripping one or more tree trunks for hauling them to a desired location. The loading grapple 23 can also be rotated so that the felled trees in the loading grapple 23 can be brought to a suitable position when they are e.g. loaded into or unloaded from the load space 16. The crane 22 is selectively positioned by a drive system 24. The work vehicle 10 may further be considered to include a power train 26, a control system 28, and a hydraulic system 30. The work vehicle 10 includes a tandem wheel assembly 32 on the rear frame 14 for mounting two wheels 36, 38 on a left side of the work vehicle 10 and for mounting two wheels 42, 44 on a right side of the work vehicle 10, and further may have a like tandem wheel assembly on the front frame 18 for mounting two wheels on a left side of the work vehicle 10 and for mounting two wheels on a right side of the work vehicle 10. Each wheel 36, 38, 42, 44 is mounted on the tandem wheel assembly 32 by a wheel end hub 46. The wheels 36, 38, 42, 44 include a pair of left wheels defined by a first left wheel 36 and a second left wheel 38, and a pair of right wheels defined by a first right wheel 42 and a second right wheel 44 (also collectively referred to as "the four tandem wheels 36, 38, 42, 44"). It should be noted that any left/right wheel pairs may be arranged as dual wheels on each left/right lateral side of the work vehicle 10 (e.g., sides in the x-direction illustrated in FIG. 1).

Generally, the power train 26 includes a source of propulsion 50, such as an engine, which supplies power to the work vehicle 10, as either direct mechanical power or after being converted to electric power (e.g., via batteries) or hydraulic power. In one example, the engine may be an internal combustion engine, such as a diesel engine, that is controlled by an engine control module (not shown) of the control system 28. It should be noted that the use of an internal combustion engine is merely an example, as the source of propulsion 50 may be a fuel cell, an electric motor, a hybrid-gas electric motor, or other power-producing devices. A transmission 52 transmits power from the source of propulsion 50 to one or more of the wheels 36, 38, 42, 44. Additionally, the power train 26 has wheel steering components 54, including various devices (e.g., power steering pumps and lines, steering mechanisms, and the like) that couple manual (e.g., operator steering controls or wheel) and/or automated (via the control system 28) steering input to one or more of the sets of wheels.

In addition to providing tractive power to propel the work vehicle 10, the source of propulsion 50 may provide power to various onboard subsystems, including various electrical and hydraulic components of the work vehicle 10, and for off-boarding power to other sub-systems remote from the work vehicle 10. For example, the source of propulsion 50 may provide mechanical power that is converted to an electric format to run the electronics of the control system 28 and one or more electric drives of the work vehicle 10. The power train 26 thus may have mechanical to electrical power conversion components 56, one or more batteries 58, and associated electronics, including various alternators, generators, voltage regulators, rectifiers, inverters, and the like. The source of propulsion 50 may also provide mechanical power that is converted to hydraulic format to power various pumps and compressors that pressurize fluid to drive various actuators of the hydraulic system 30 in order to power wheel steering and braking and various work implements onboard the work vehicle 10. The hydraulic system 30 may include other components (e.g., valves, flow lines, pistons/cylinders, seals/gaskets, and so on), such that control of various devices may be effected with, and based upon, hydraulic, mechanical, or other signals and movements.

The control system 28 may be configured as a computing device with associated processor devices and memory architectures, as a hard-wired computing circuit (or circuits), as a programmable circuit, as a hydraulic, electrical, or electro-hydraulic controller. The control system 28 may be configured to execute various computational and control functionality with respect to the work vehicle 10, including various devices associated with the power train 26, the hydraulic system 30, the drive system 24, and various additional components of the work vehicle 10. In some embodiments, the control system 28 may be configured to receive input signals in various formats (e.g., as hydraulic signals, voltage signals, current signals, and so on), and to output command signals in various formats (e.g., as hydraulic signals, voltage signals, current signals, mechanical movements, and so on).

As noted above, the hydraulic system 30 may be controlled by the control system 28 (automatically, via operator input, or both). The hydraulic system 30 may be powered by the source of propulsion 50 and configured in various arrangements to serve a plurality of hydraulic functions (e.g., powering the drive system 24). Accordingly, the hydraulic system 30 may have components (not shown) including a pump for supplying pressurized hydraulic fluid, a reservoir for storing hydraulic fluid, and various valves (e.g., a control valve) associated with each function.

In the illustrated example, when the work vehicle 10 drives in the forward direction (indicated in FIG. 1), the tandem wheel assembly 32 follows behind the connection of the crane 22 and the rear frame 14 and supports most weight on the rear frame 14. The tandem wheel assembly 32 is pivotable about a pivot axis 60. In particular, each of the pair of the left wheels 36, 38 and the pair of right wheels 42, 44 can independently pivot relative to the work vehicle 10 about the pivot axis 60. During use, if the work vehicle 10 encounters an obstacle or an uneven surface, the tandem wheel assembly 32 accommodates this by pivoting relative to the chassis 12 of the work vehicle 10, and the reaction assemblies 34, which form a walking beam configuration, counteract the forces that cause the tandem wheel assembly 32 to pivot. As a result, the reaction assemblies 34 provide improved downforce distribution to each of the pair of the left wheels 36, 38 and the pair of right wheels 42, 44 during operation of the work vehicle 10, especially during acceleration and deceleration of the work vehicle 10. The reaction assemblies 34 respond to input torque changes with reactive forces or moments to maintain each of the pair of the left wheels 36, 38 and the pair of right wheels 42, 44 into engagement with the ground. As a result, the transfer of bumps or terrain changes is mitigated or eliminated, maintaining the crane 22 and the cabin 20 in a relatively stable position that maintains traction and weight distribution.

The tandem wheel assembly 32 mounts the four tandem wheels 36, 38, 42, 44 below the rear frame 14. The example tandem wheel assembly 32, FIG. 2, may include a differential housing 62, first mounting arms 64, second mounting arms 66, first and second pivot cages 68, and first and second tandem wheel housings 70 in which the reaction assemblies 34 are respectively mounted. The pivot cages 68 are disposed about the pivot axis 60 rigidly fixed relative to the rear frame 14 and functions, in part, as the central pivot about which the tandem wheel assembly 32, and the four tandem wheels 36, 38, 42, 44, pivot relative to the work vehicle 10. The differential housing 62 is rigidly affixed to the first and second mounting arms 64, 66, which are fixed to the chassis 12 of the work vehicle 10 (e.g., via bolts through arm bores of the mounting arms 64, 66). Thus, the differential housing 62 and the pivot cages 68 are fixed in place relative to each other, and one or both of the first and second tandem wheel housings 70 pivot independently relative to the differential housing 62 and the respective first and second pivot cages 68.

Figure 3:
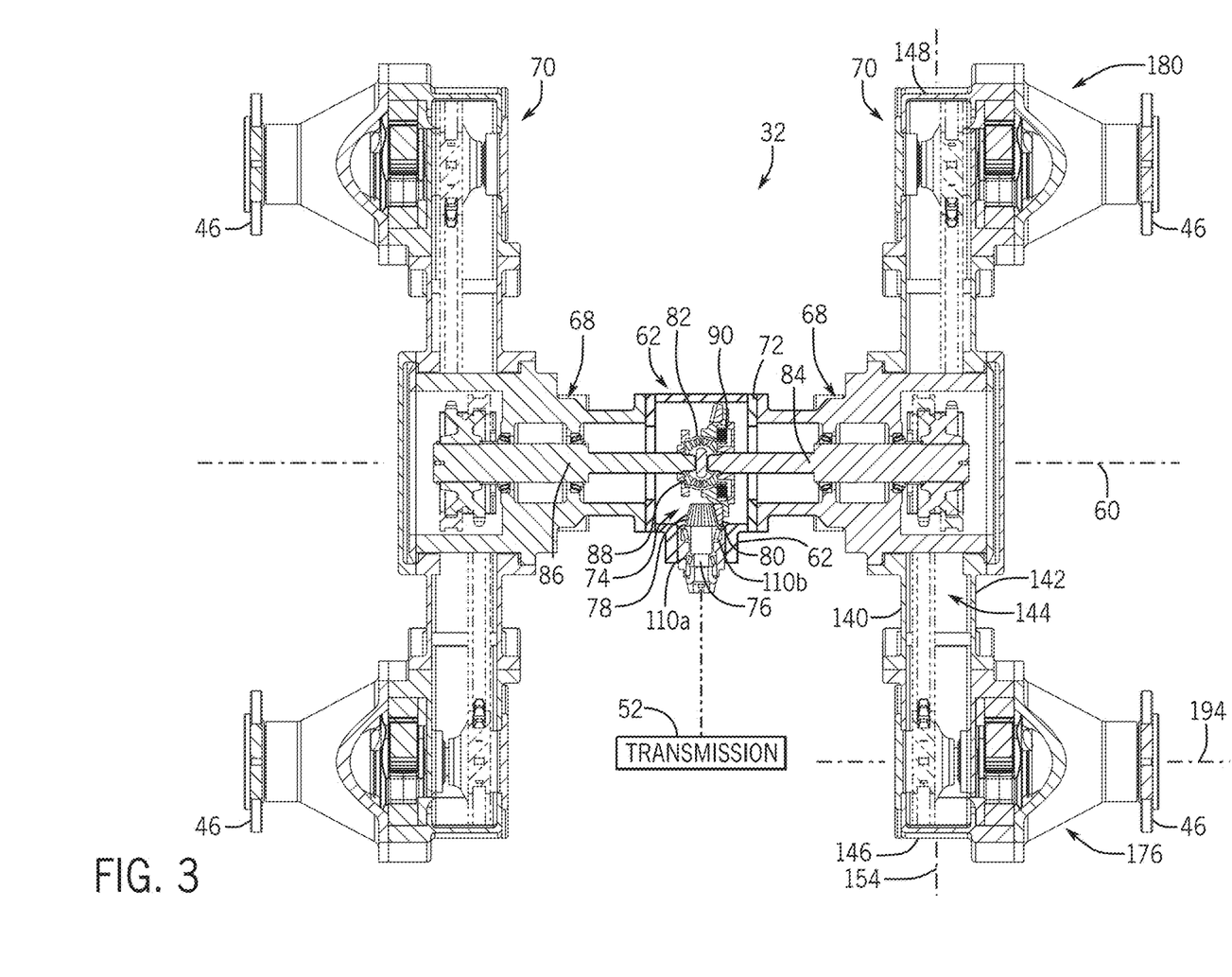
FIG. 3 is a top cross-sectional view of the example tandem wheel assembly through plane 3-3 of FIG. 2.

As also noted above, the tandem wheel assembly 32 includes components of the power train 26 to transmit motive power to each of the four wheels 36, 38, 42, 44, FIG. 3. A differential 74 is mounted in the differential housing 62 and connected to a driveshaft 76 that is driven by the transmission 52. The differential 74 includes gearing components to split and translate rotation of the driveshaft 76 laterally outboard toward the first and second tandem wheel housings 70. A pinion gear 78 at the end of the driveshaft 76 meshes with a differential ring gear 80 mounted with a differential case 82 that is coupled to a first shaft 84 and a second shaft 86 (via a side gear 88). The differential 74 may be a limited-slip differential with a clutch pack 90 for resisting slip. Although not illustrated in detail, the differential housing 62 may house additional components of the differential 74, including brakes, u-joint(s), ring gear, pinion shaft(s), pinion gear(s), planet gear(s), side gears, clutch plates, bearings, and the like. Any type of differential may be implemented within the tandem wheel assembly 32, including an open differential, limited slip differential, or the like. The differential housing 62 also mounts portions of the driveshaft 76 and portions of the first and second shafts 84, 86. A hydraulically applied brake 72 may be provided and engaged with the shafts 84, 86 as is known in the art.

Figure 6:
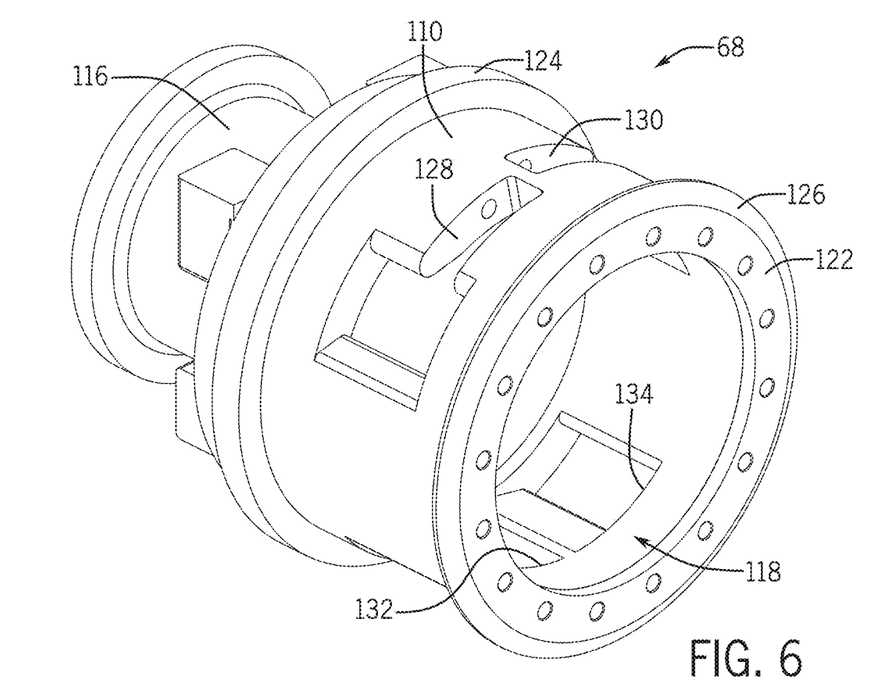
FIG. 6 is an isometric view of a pivot cage of the example tandem wheel assembly.
Figure 7:
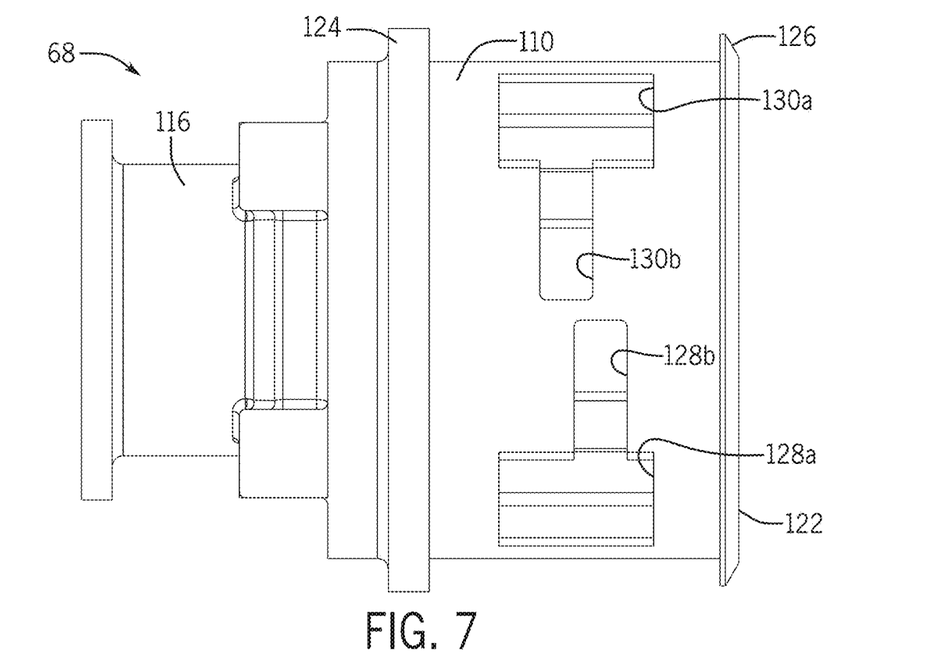
FIG. 7 is a top plan view of the pivot cage.
Figure 8:
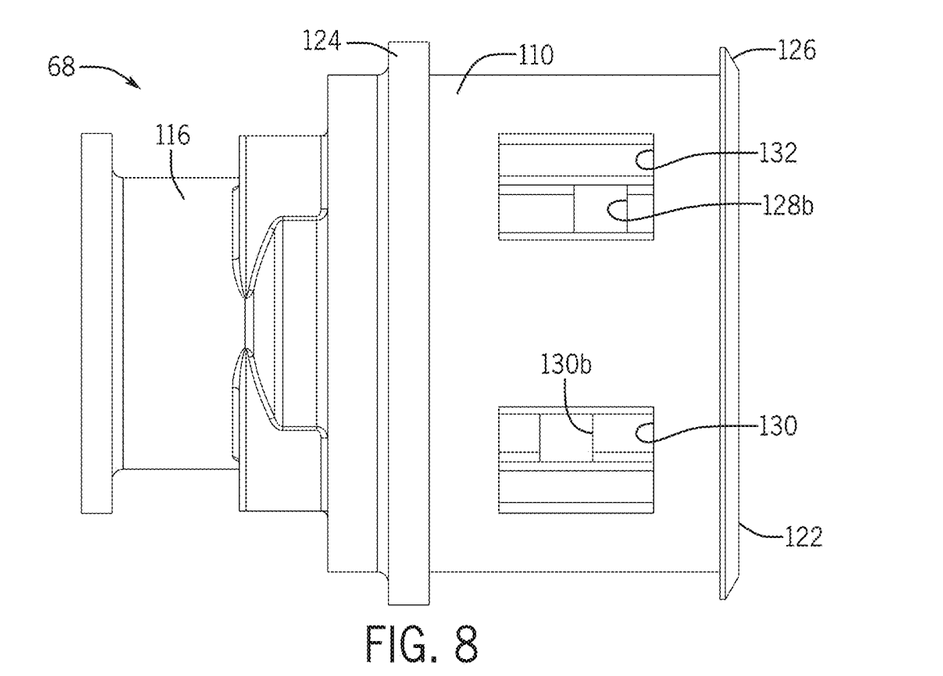
FIG. 8 is a bottom plan view of the pivot cage.

Referring also to FIGS. 6-8, each pivot cage 68 has an annular body 110 disposed about the pivot axis 60 and which extends between an inboard end 112 thereof and an outboard end 114 thereof. Each pivot cage 68 further has an extending body portion 116 which extends from the inboard end 112 and is coupled to the chassis 12 by the brake 72 and the differential housing 62. A cavity 118 extends from an inner end 120 of the extending body portion 116 to an outer end 122 of the annular body 110 at the outboard end 114. An inboard flange 124 extends radially outward from the annular body 110 at the inboard end 112, and an outboard flange 126 extends radially outward from the annular body 110 at the outboard end 114. The outboard flange 126 may be provided as a separate component and attached to the annular body 110. At least one opening is provided through the annular body 110 between the flanges 124, 126 and is in communication with the cavity 118. As shown, the at least one opening is provided by a forward upper opening 128, a rearward upper opening 130, a forward lower opening 132, a rearward lower opening 134. As shown, each upper opening 128, 130 is generally T-shaped, having a lower portion 128a, 130a that is wider than an upper portion 128b, 130b. The upper portions 128b, 130b are laterally offset from each other and the lower portions 128a, 130a are aligned with each other in a fore-aft direction. As shown, the upper portion 128b of forward upper opening 128 is outboard of the upper portion 130b of the rearward upper opening 130, however, the upper portion 128b of forward upper opening 128 may be inboard of the upper portion 130b of the rearward upper opening 130. This reduces the size of the pivot cage 68. In an embodiment, the upper portions 128b, 130b are aligned with each other in the fore-aft direction. The lower portion 128a is laterally aligned with the forward lower opening 132; the lower portion 130a is laterally aligned with the rearward lower opening 134. The lower openings 132, 134 are aligned with each other in a fore-aft direction. The first and second pivot cages 68 may be formed of cast metal or other suitable structural material.

Figure 2:
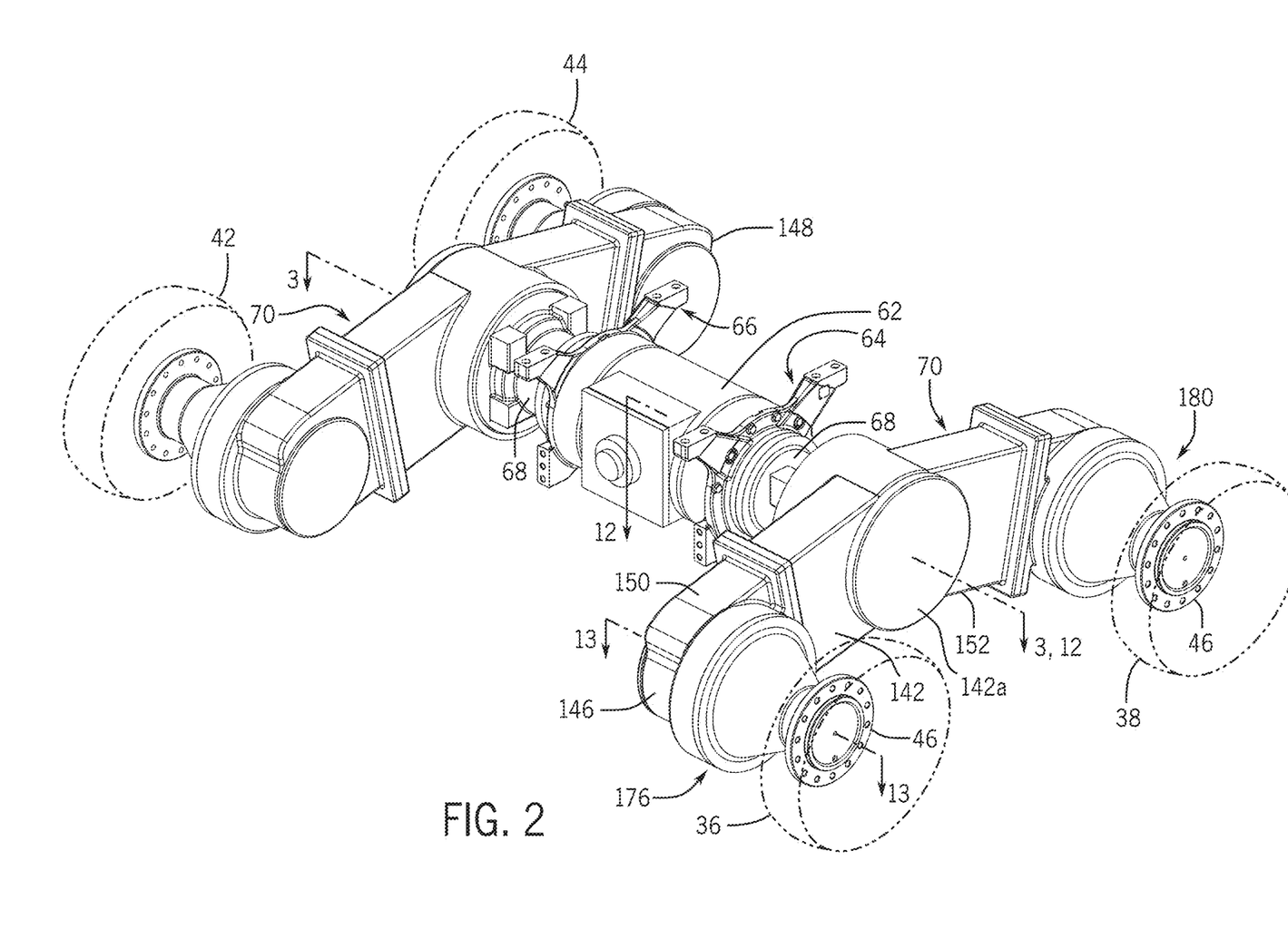
FIG. 2 is an isometric view of an example tandem wheel assembly for the example forwarder.
Figure 5:
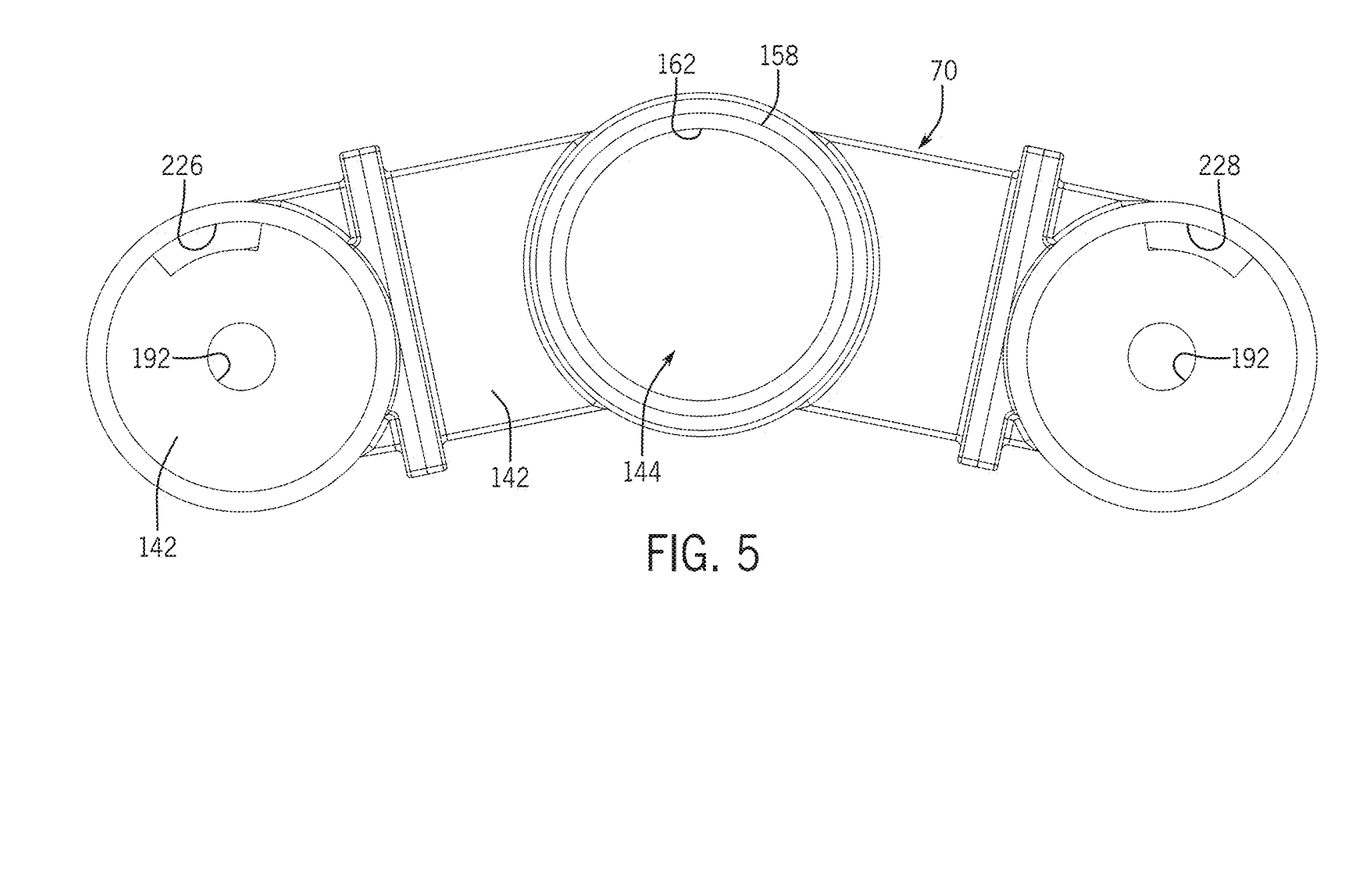
FIG. 5 is a side elevation view of a tandem wheel housing of the example tandem wheel assembly.

Each tandem wheel housing 70, FIGS. 2 and 5, is a generally hollow part that has an inboard wall 140 and an outboard wall 142 defining an internal volume 144 that extends from a front wall 146 to a rear wall 148 and extends between an upper wall 150 and a lower wall 152. A longitudinal axis 154 of the tandem wheel housing 70 is defined between the front wall 146 and the rear wall 148 and is perpendicular to the pivot axis 60. The tandem wheel housings 70 may be formed of cast metal or other suitable structural material. The inboard and outboard walls 140, 142 have shoulders 156, 158 which define aligned center openings 160, 162 about the pivot axis 60 which communicate with the internal volume 144 and in which the annular body 110 of the respective pivot cage 68 nests or seats so that the tandem wheel housing 70 can pivot around the pivot cage 68 and relative to the chassis 12. Shoulder 156 is outboard of the inboard flange 124 and shoulder 158 is inboard of the outboard flange 126. A portion of the outboard wall 142 may be formed by a separate cover 142a that can be removed to expose opening 162. Each tandem wheel housing 70 may be made in a modular form; as shown each tandem wheel housing 70 has three parts which are affixed together.

Figure 12:
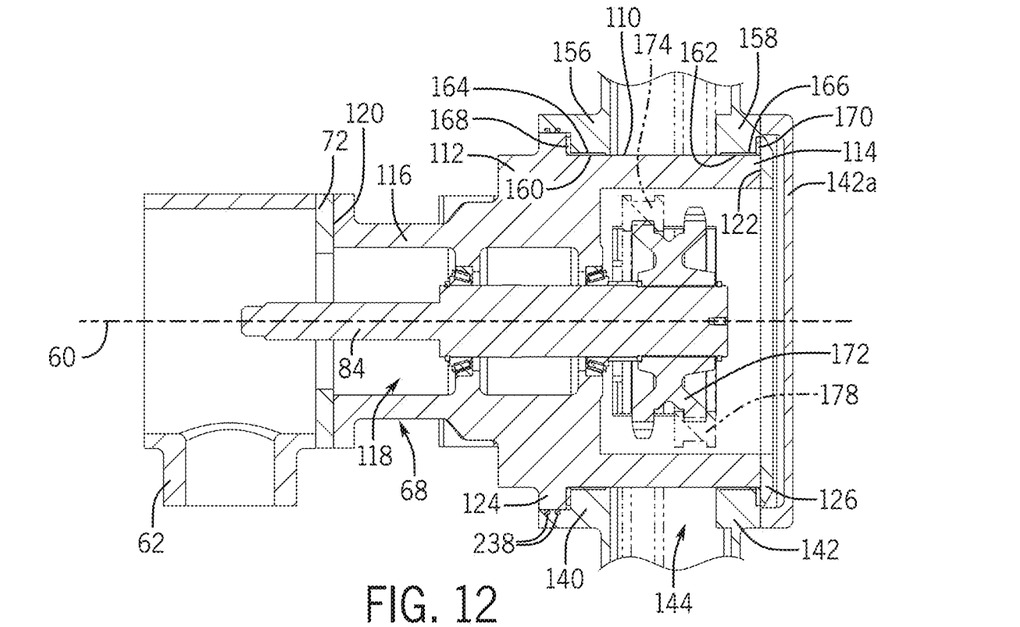
FIGS. 12 and 13 are partial cross-sectional views of the example tandem wheel assembly showing areas 12-12 and 13-13 of FIG. 2, respectively.

A plurality of circular bushings 164, 166 and bearings 168, 170, FIG. 12, are provided between the pivot cage 68 and the tandem wheel housing 70 to promote pivoting of the tandem wheel housing 70 relative to the pivot cage 68. An inboard bushing 164 is disposed between an inner surface of the shoulder 156 that faces the annular body 110 of the pivot cage 68 and an outer surface of the annular body 110 and is inboard of the openings 128, 130, 132, 134. An inboard thrust bearing 168 is disposed between an outboard surface of the inboard flange 124 and an inboard surface of the inboard shoulder 156. An outboard bushing 166 is disposed between an inner surface of the shoulder 158 that faces the annular body 110 of the pivot cage 68 and the outer surface of the annular body 110 and is outboard of the openings 128, 130, 132, 134. An outboard thrust bearing 170 is disposed between an inboard surface of the outboard flange 126 and an outboard surface of the outboard shoulder 158.

The components in each tandem wheel housing 70 may be identical, mirror images. Each tandem wheel housing 70 has a center sprocket 172 mounted for co-rotation with the respective shafts 84, 86, a first chain 174 connecting the center sprocket 172 to a front wheel end assembly 176 on a first side of the center sprocket 172, and a second chain 178 connecting the center sprocket 172 to a rear wheel end assembly 180 on a second side of the center sprocket 172, FIG. 12. In some embodiments, the center sprocket 172 is a dual-ring sprocket that mounts the first chain 174 extending to the front wheel end assembly 176 and the second chain 178 extending to the rear wheel end assembly 180. The center sprocket 172 is positioned laterally outboard of the inboard bushing 164 and the laterally inboard of the outboard busing 166.

Figure 13:
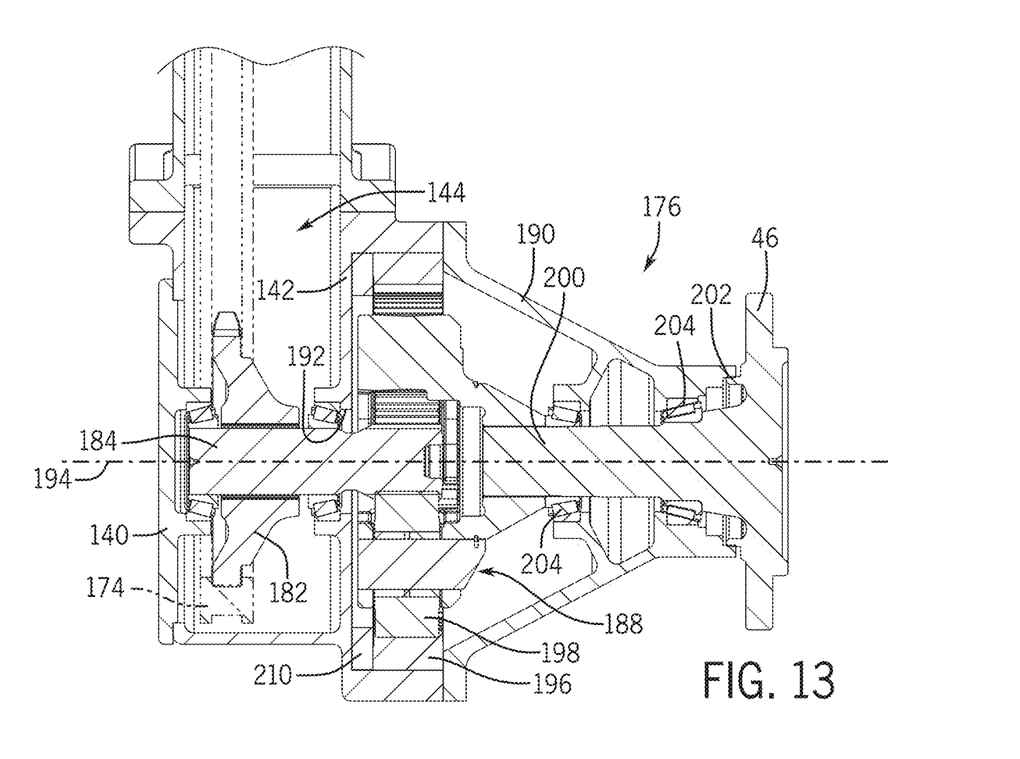

Each wheel end assembly 176, 180, FIG. 13, includes a wheel end sprocket 182 mounted on a shaft 184 for co-rotation therewith, a wheel end gear train 188 coupled to the shaft 184, a wheel end housing 190, and a wheel end hub 46. The wheel end housing 190 is fixedly mounted on the outboard wall 142 of the tandem wheel housing 70. The shaft 184 is rotationally mounted to the inboard wall 140, extends through a wheel end opening 192 in the outboard wall 142 and extends laterally outboard from the outboard wall 142. The shaft 184 extends laterally outward of the outboard wall 142 and is coupled to the wheel end gear train 188. A wheel end axis 194 is defined by the shaft 184.

The wheel end sprocket 182 of the front wheel end assembly 176 is aligned with one of the dual rings of the center sprocket 172 and connected thereby by the first chain 174. The first chain 174 passes through the lower portion 128a of the forward upper opening 128 in the pivot cage 68, around the center sprocket 172, through the forward lower opening 132 in the pivot cage 68, and around the wheel end sprocket 182 of the front wheel end assembly 176. The wheel end sprocket 182 of the rear wheel end assembly 180 is aligned with the other of the dual rings of the center sprocket 172 and connected thereby by the second chain 178. The second chain 178 passes through the lower portion 130a of the rearward upper opening 130 in the pivot cage 68, around the center sprocket 172, through the rearward lower opening 134 in the pivot cage 68, and around the wheel end sprocket 182 of the rear wheel end assembly 180. Although the first chain 174 is illustrated as mounted inboard relative to the second chain 178, these relative positions may be reversed. The wheel end sprockets 182 will have an equal size (e.g., equal number of teeth) to drive the corresponding first and second left wheels 36, 38 (or the first and second right wheels 42, 44) at a substantially equal speed. The first and second chains 174, 178 may be leaf chains, roller chains, or other suitable drive chains for heavy construction applications. The chains 174, 178 may be continuous chains without a disassembling or "master" link to improve the torque-handling capabilities of the chains 174, 178. In some embodiments, the openings 128, 132 are continuous, and the openings 130, 134 are continuous. In some embodiments, the openings 128, 130 are continuous, and the openings 132, 134 are continuous. In some embodiments, all of the openings 128, 132, 130, 134 are continuous.

The wheel end gear train 188 includes a ring gear 196, and a planetary gear seat 198 coupled to the ring gear 196. A shaft 200 of the wheel end hub 46 extends through a wheel end opening 202 in the wheel end housing 190 and is coupled to the planetary gear seat 198. The shaft 200 supports the wheel end hub 46 of the respective wheel 36, 38, 42, 44 for co-rotation therewith around the wheel end axis 194. The wheel end gear train 188 is mounted within the wheel end housing 190 and effects a gear ratio change to rotate the associated wheel end hub 46 and its shaft 200 about the associated wheel end axis 194. The ring gear 196 is rotatable relative to the wheel end housing 190 as described herein. Other configurations of the wheel end gear train 188 may be incorporated without departing from the scope of the present disclosure.

Each wheel end housing 190 extends laterally outboard from the outboard wall 142 and has the wheel end opening 202 at the end thereof that supports at least a portion of the wheel end hub 46. The wheel end housing 190 may be cone shaped. The shaft 200 of the wheel end hub 46 extends through the wheel end housing 190 and the wheel end opening 202, and the shaft 200 and its wheel end hub 46 are supported in the wheel end housing 190 by rotational bearings 204. The wheel end housing 190 may mount various additional supporting components (not shown) such as roller bearings.

The wheel end shaft 184 of the front wheel end assembly 176 defines a front wheel end axis 194 that is a rotation axis of the front wheel end hub 46 and the wheel 36 (or wheel 42 on the right side of the work vehicle 10), the front wheel end shaft 184 and the front wheel end sprocket 182 when driven by the center sprocket 172 via the first chain 174. This front wheel end axis 194 is substantially parallel to the pivot axis 60. The wheel end shaft 184 of the rear wheel end assembly 180 defines a rear wheel end axis 194 that is a rotation axis of the rear wheel end hub 46 and the wheel 38 (or wheel 44 on the right side of the work vehicle 10), the rear wheel end shaft 184 and the rear wheel end sprocket 182 when driven by the center sprocket 172 via the second chain 178. This rear wheel end axis 194 is substantially parallel to the pivot axis 60. Accordingly, when the center sprocket 172 rotates, the chains 174, 178 provide co-rotation of the wheel end sprockets 182 of the wheel end assemblies 176, 180, and rotation of the wheels 36, 38, 42, 44.

Figure 4:
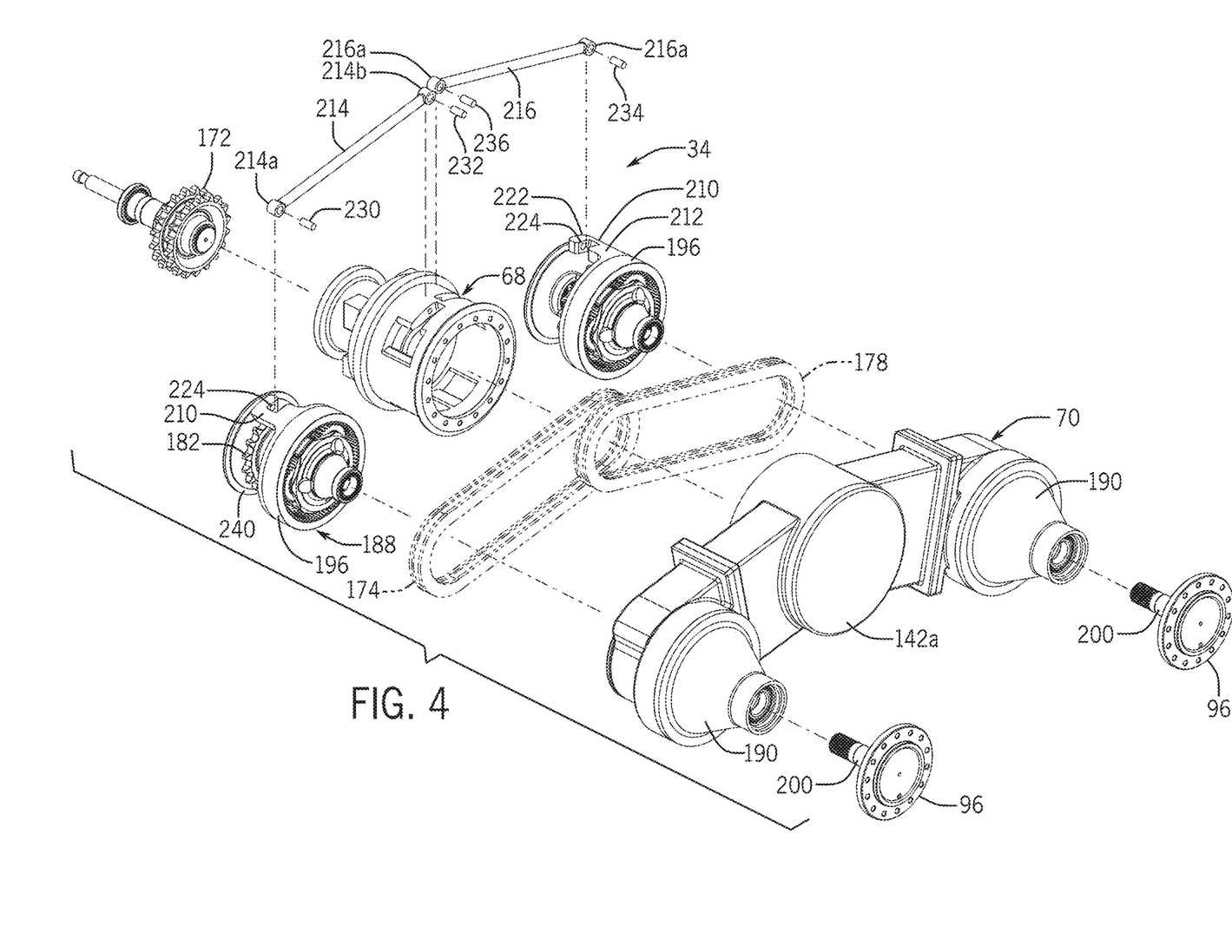
FIG. 4 is an exploded, isometric view of the example tandem wheel assembly.

Each reaction assembly 34, FIG. 4, includes the pivot cage 68, a front reaction bar support 210 attached to an inboard end of the ring gear 196 of the wheel end gear train 188 of the front wheel end assembly 176 for co-rotation therewith, a rear reaction bar support 212 attached to an inboard end of the ring gear 196 of the wheel end gear train 188 of the rear wheel end assembly 180 for co-rotation therewith, a front reaction bar 214 coupled between the front reaction bar support 210 and the pivot cage 68, and a rear reaction bar 216 coupled between the rear reaction bar support 212 and the pivot cage 68.

Figure 9:
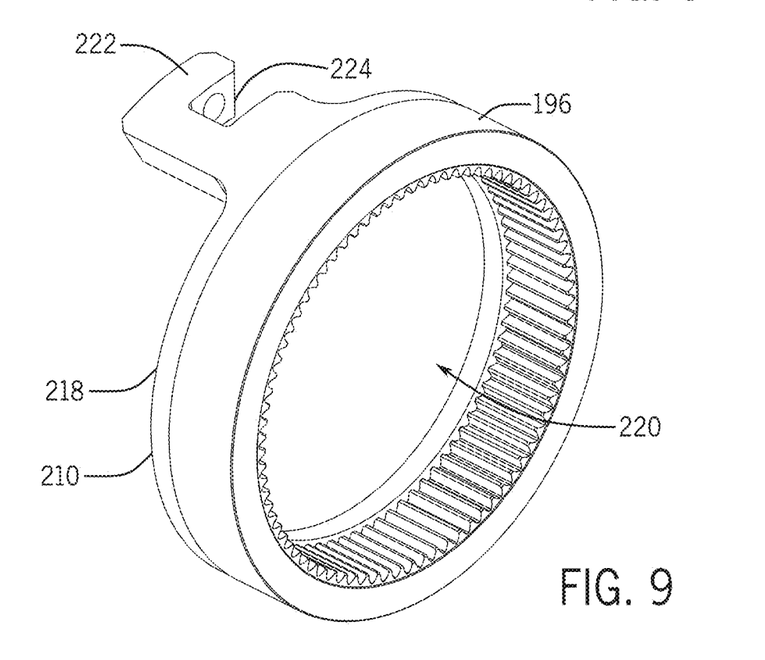
FIG. 9 is an isometric view of a reaction bar support of the example tandem wheel assembly.

Each reaction bar support 210, 212, FIG. 9, includes an annular body portion 218 having a central aperture 220 therethrough which is slightly larger than the aperture through the ring gear 196. An outboard end of the annular body portion 218 is attached to the inboard end of the ring gear 196 for co-rotation therewith. A hook portion 222 extends from an inboard end of the body portion 218 and has a recess 224 therein. The recess 224 of the front reaction bar support 210 faces rearwardly and the recess 224 of the rear reaction bar support 212 faces forwardly. Each recess 224 may be generally square shaped. The hook portions 222 of the reaction bar supports 210, 212 extend through respective arcuate-shaped receiving openings 226, 228 in the outboard wall 142 of the tandem wheel housing 70, FIG. 5, which are proximate to the wheel end openings 192 at the opposite ends of the tandem wheel housing 70. The receiving openings 226 are spaced vertically above the respective wheel end openings 192. Each receiving opening 226, 228 has a length in a fore-aft direction which is greater than a length of the hook portion 222. The receiving openings 226, 228 provide for communication of the internal volume of the wheel end housing 190 with the internal volume 144 of the tandem wheel housing 70.

Figure 10:
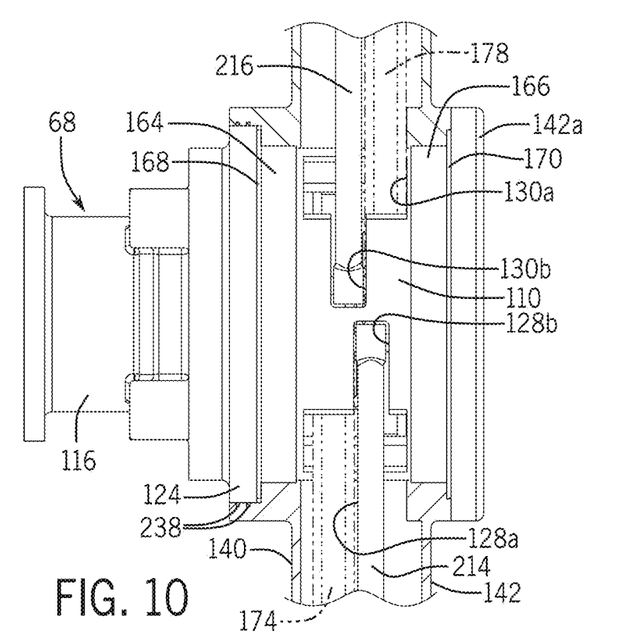
FIGS. 10 and 11 are partial top elevation views of the example tandem wheel assembly, with the tandem wheel housing shown broken away.
Figure 11:
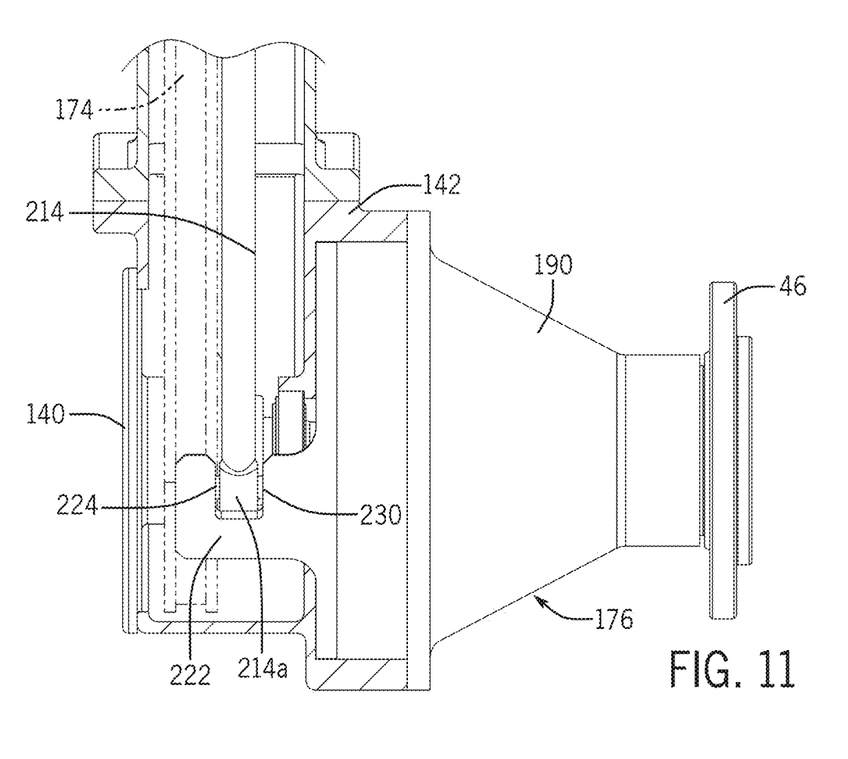

Each reaction bar 214, 216, FIG. 4, is an elongate and rigid member. The front reaction bar 214 includes a front end 214a that seats in the recess 224 of the front reaction bar support 210, FIG. 11, and is pivotally coupled to the hook portion 222 of the front reaction bar support 210 by a pivot pin 230 that extends through the front end 214a and seats within apertures in the walls forming the recess 224 of the reaction bar support 210, and includes a rear end 214b that seats in the forward upper opening 128 of the pivot cage 68 and is pivotally coupled to the annular body 110 of the pivot cage 68 by a pivot pin 232 that extends through the rear end 214b and seats within apertures in the walls forming the upper portion 128b of the forward upper opening 128, FIG. 10. The front reaction bar 214 is laterally offset from the chain 174, and as shown is laterally inboard of the chain 174. The front reaction bar 214 can pivot relative to the pivot cage 68 and relative to the front reaction bar support 210. The rear reaction bar 216 includes a rear end 216a that seats in the recess 224 of the rear reaction bar support 212 and is pivotally coupled to the hook portion 222 of the reaction bar support 212 by a pivot pin 234 that extends through the rear end 216a and seats within apertures in the walls forming the recess 224 of the rear reaction bar support 212, and includes a front end 216*b* that seats in the rearward upper opening 130 of the pivot cage 68 and is pivotally coupled to the annular body 110 of the pivot cage 68 by a pivot pin 236 that extends through the front end 216*b* and seats within apertures in the walls forming the upper portion 130*b* of the rearward upper opening 130. The reaction bar 216 is laterally offset from the chain 178, and as shown is laterally outboard of the chain 178. The rear reaction bar 216 can pivot relative to the pivot cage 68 and relative to the rear reaction bar support 212. The front and rear reaction bars 214, 216 can pivot relative to each other. The reaction bars 214, 216 seat within the internal volumes 144 the tandem wheel housings 70. This provides for a significantly compact design compared to prior art designs which had the reactions bars exposed. In addition, the provision of the reaction bars 214, 216 within the internal volume 144 prevent a moving part from being exposed to outside elements that could damage the reaction bars 214, 216.

In certain embodiments, working elements of the tandem wheel assembly 32 may be partially or entirely engulfed in lubricants, such as lubricating and cooling oil such that a "wet" environment is provided. The lubricant may be provided in the internal volumes 144 the tandem wheel housings 70 and the cavities 118 of the pivot cages 68. This lubricant assists in maintaining the moving components therein in good working order. To prevent the lubricant from leaking out from between the connection between the tandem wheel assembly 32 and the pivot cage 68 proximate to the shoulder 156, and the surfaces of the annular body 110 and the flanges 124, 126, at least one seal 238 is disposed between the inboard wall 140 inboard of the shoulder 156 and the outer surface of the inboard flange 124. The inboard flange 124 has an outer circumference and the inboard wall of the tandem wheel housing 70 has an inner circumference at the center opening 160, and the at least one seal 238 is disposed between the outer circumference of the inboard flange 124 and the inner circumference of the inboard wall 140. The at least one seal 238 provides a liquid-tight seal therebetween to substantially prevent the leakage of lubricant therethrough. The seals 238 may be V-shaped.

To propel the work vehicle 10, the source of propulsion 50 provides power to the transmission 52 that drives the differential 74 and the shaft 84, which, in turn, drives the center sprocket 172 in each tandem wheel housing 70. The center sprocket 172 drives the first and second chains 174, 178, which respectively rotate the first and second wheel end sprockets 182 and its shafts 200 to ultimately turn the pair of right wheels 36, 38 mounted on the wheel end assemblies 176, 180 (or to ultimately turn the pair of left wheels 36, 38 mounted on the wheel end assemblies 176, 180 in the left tandem wheel housing 70). The transmission 52 generally includes one or more gear arrangements and/or clutches (not shown) to modify the speed of the input from the source of propulsion 50 into one or more speeds suitable for the tandem wheel assembly 32. The rotation of the shaft 200 of the front wheel end assembly 176 rotates the wheel end gear train 188, including rotation of the ring gear 196 and the front reaction bar support 210 relative to the wheel end housing 190. The amount of rotation of the ring gear 196 and the front reaction bar support 210 is limited by the length of the receiving opening 226. Likewise, the rotation of the shaft 200 of the rear wheel end assembly 180 rotates the wheel end gear train 188, including rotation of the ring gear 196 and the rear reaction bar support 212 relative to the wheel end housing 190. The amount of rotation of the ring gear 196 and the rear reaction bar support 212 is limited by the length of the receiving opening 228.

The positioning of the center sprocket 172 between the bushings 164, 166 acts to center the center sprocket 172 over the overall tandem wheel housing 70 and balances and distributes the load across the tandem wheel housing 70 as the tandem wheel housing 70 pivots relative to the pivot cage 68. The provision of the outboard bushing 166 improves the overall turning moment which extends through the bushings 164, 166. In addition, the ground pushing upwardly on the wheels 36, 38, 42, 44 causes moments to be formed at the outward ends of the tandem wheel housing 70. By providing the outboard bushing 166 outward of the center sprocket 172 which is more in line with the wheels 36, 38 or 40, 42, the moment arms are reduced which decreases the moments formed at the outward ends of the tandem wheel housing 70 to improve the overall load capabilities.

In some scenarios, an increase of power from the source of propulsion 50 may tend to rotate the reaction assembly 34 about the pivot axis 60, lifting the leading wheel 36 or 42 from the ground while increasing the downward pressure on the trailing wheel 38 or 44. To counteract this tendency, the reaction bars 214, 216 provide an opposing force, transferring torque directly to the chassis 12. Also, a sudden decrease in power from the source of propulsion 50 may reverse the direction of rotation of the reaction assembly 34 about the pivot axis 60; however, these forces may be counteracted by the reaction bars 214, 216. Accordingly, rotation of the reaction assembly 34 relative to the chassis 12 may be limited, and torque delivered to the wheels 36, 38 or 42, 44 may be substantially equal.

The foregoing describes one or more example tandem wheel assemblies in detail. Various other configurations are possible within the scope of this disclosure. For example, the disclosed dual ring two chain drive in the tandem wheel housing may be replaced with a single ring center sprocket and a single chain coupling the center sprocket to both wheel end sprockets.

Enumerated Examples

Also, the following examples are provided, which are numbered for easier reference.

1. A tandem wheel assembly for a work vehicle having a chassis and wheels, the tandem wheel assembly comprising: a tandem wheel housing having an inboard wall and an outboard wall both defining, at least in part, an interior, the inboard wall and the outboard wall both defining a center opening extending along a pivot axis and wheel end openings extending along associated wheel axes; a pivot cage configured to fixedly mount to the chassis and disposed about the pivot axis at the center opening of the tandem wheel housing, the pivot cage having an annular body extending between an inboard end and an outboard end, the inboard wall and the outboard wall of the tandem wheel housing being pivotally mounted to the pivot cage at, respectively, the inboard end and the outboard end of the annular body; a center sprocket disposed within and rotatable with respect to the pivot cage; wheel end assemblies each disposed at one of the wheel end openings, each wheel end assembly having a wheel end sprocket, a wheel end gear train, and a wheel end hub, each wheel end sprocket being supported within the tandem wheel housing for rotation by at least one chain coupled to the center sprocket, each wheel end gear train being coupled for rotation by the associated wheel end sprocket and configured to effect a gear ratio change and rotate the associated wheel end hub about the associated wheel end axis; and a pair of reaction bars, each being pivotally coupled at one end to the annular body of the pivot cage and at an opposite end to a component of the wheel end gear train.

2. The tandem wheel assembly of example 1, wherein the reaction bars extend within the interior of the tandem wheel housing.

3. The tandem wheel assembly of example 1, wherein the annular body of the pivot cage has at least one opening therethrough between the inboard end and the outboard end; and wherein the reaction bars extend through the at least one opening of the annular body of the pivot cage.

4. The tandem wheel assembly of example 1, wherein the pivot cage includes an inboard flange at the inboard end of the annular body; and further including at least one inboard seal disposed between the inboard flange and the inboard wall of the tandem wheel housing.

5. The tandem wheel assembly of example 4, wherein the inboard flange has an outer circumference and the inboard wall of the tandem wheel housing has an inner circumference at the center opening, the at least one inboard seal being disposed between the outer circumference of the inboard flange and the inner circumference of the inboard wall.

6. The tandem wheel assembly of example 4, further comprising a lubricant within an internal volume of the tandem wheel housing and an internal volume of the pivot cage.

7. The tandem wheel assembly of example 1, wherein the pivot cage includes an inboard flange at the inboard end of the annular body and an outboard flange at the outboard end of the annular body; wherein the inboard wall and the outboard wall of the tandem wheel housing define an inboard shoulder and an outboard shoulder, the inboard shoulder being outboard of the inboard flange and the outboard shoulder being inboard of the outboard flange; and further including: an inboard bushing disposed between the inboard shoulder and the annular body of the pivot cage; and an outboard bushing disposed between the outboard shoulder and the annular body of the pivot cage.

8. The tandem wheel assembly of example 7, further including: an inboard thrust bearing disposed between the inboard flange and the inboard shoulder; and an outboard thrust bearing disposed between the outboard flange and the outboard shoulder.

9. The tandem wheel assembly of example 1, wherein each of the reaction bars is pivotally coupled to one of the gear trains and to the pivot cage by pin joints.

10. The tandem wheel assembly of example 1, wherein the annular body of the pivot cage includes one or more upper openings through which the at least one chain extends and one or more lower openings through which the at least one chain extends; and wherein each reaction bar is pivotally attached to the pivot cage above the one or more upper openings.

11. The tandem wheel assembly of example 1, wherein the inboard wall and the outboard wall of the tandem wheel housing define an inboard shoulder and an outboard shoulder; and further including: an inboard bushing disposed between the inboard shoulder and the annular body of the pivot cage; and an outboard bushing disposed between the outboard shoulder and the annular body of the pivot cage; and wherein the reaction bars extend within the interior of the tandem wheel housing.

12. The tandem wheel assembly of example 11, wherein the reaction bars are pivotally coupled to the annular body between the inboard bushing and the outboard bushing; and wherein one of the reaction bars is outboard of the other reaction bar.

13. The tandem wheel assembly of example 12, wherein the pivot cage includes upper openings and lower openings; and wherein the at least one chain includes a first chain coupled between one wheel end sprocket and the center sprocket and extending through a first of the upper openings and a first of the lower openings, and a second chain coupled between the other wheel end sprocket and the center sprocket and extending through a second of the upper openings and a second of the lower openings.

14. The tandem wheel assembly of example 1, wherein each wheel end gear train is a planetary set that includes a ring gear; and wherein the reaction bars are pivotally coupled to the ring gears.

15. The tandem wheel assembly of example 1, wherein the center sprocket has dual chain rings; and wherein the at least one chain includes a first chain coupled between one wheel end sprocket and the center sprocket and a second chain coupled between the other wheel end sprocket and the center sprocket.

CONCLUSION

The examples discussed above result in a variety of benefits of the disclosed tandem wheel assembly. For example, the reaction bars are pivotally coupled at one end to the annular body of the pivot cage and at an opposite end to a component of the wheel end gear train to provide for the transfer and distribution of forces between the wheels as the work vehicle travels. The provision of the reaction bars within the internal volume of the tandem wheel housing protects the reaction bars from damage and maintains a good working order. The outboard bushing causes the moment arm to be moved outward toward the wheels of the work vehicle which makes the assembly more stable.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tandem wheel assembly for a work vehicle having a chassis and wheels, the tandem wheel assembly comprising:
   a tandem wheel housing having an inboard wall and an outboard wall both defining, at least in part, an interior, the inboard wall and the outboard wall both defining a center opening extending along a pivot axis and wheel end openings extending along associated wheel end axes;

a pivot cage configured to fixedly mount to the chassis and disposed about the pivot axis at the center opening of the tandem wheel housing, the pivot cage having an annular body extending between an inboard end and an outboard end, the inboard wall and the outboard wall of the tandem wheel housing being pivotally mounted to the pivot cage at, respectively, the inboard end and the outboard end of the annular body;

a center sprocket disposed within and rotatable with respect to the pivot cage;

wheel end assemblies each disposed at one of the wheel end openings, each of the wheel end assemblies having a wheel end sprocket, a wheel end gear train, and a wheel end hub, each said wheel end sprocket being supported within the tandem wheel housing for rotation by at least one chain coupled to the center sprocket, each said wheel end gear train being coupled for rotation by the associated wheel end sprocket and configured to effect a gear ratio change and rotate the associated wheel end hub about the associated wheel end axis; and a pair of reaction bars, each of the reaction bars being pivotally coupled at one end to the annular body of the pivot cage and at an opposite end to a component of the associated wheel end gear train;

wherein the annular body of the pivot cage has at least one opening therethrough between the inboard end and the outboard end through which the reaction bars extend.

2. The tandem wheel assembly of claim 1, wherein the reaction bars extend within the interior of the tandem wheel housing.

3. The tandem wheel assembly of claim 1, wherein the pivot cage includes an inboard flange at the inboard end of the annular body; and further including at least one inboard seal disposed between the inboard flange and the inboard wall of the tandem wheel housing.

4. The tandem wheel assembly of claim 3, wherein the inboard flange has an outer circumference and the inboard wall of the tandem wheel housing has an inner circumference at the center opening, the at least one inboard seal being disposed between the outer circumference of the inboard flange and the inner circumference of the inboard wall.

5. The tandem wheel assembly of claim 3, further comprising a lubricant within an internal volume of the tandem wheel housing and an internal volume of the pivot cage.

6. The tandem wheel assembly of claim 1, wherein the pivot cage includes an inboard flange at the inboard end of the annular body and an outboard flange at the outboard end of the annular body;

wherein the inboard wall and the outboard wall of the tandem wheel housing define an inboard shoulder and an outboard shoulder, the inboard shoulder being outboard of the inboard flange and the outboard shoulder being inboard of the outboard flange; and further including:
an inboard bushing disposed between the inboard shoulder and the annular body of the pivot cage; and
an outboard bushing disposed between the outboard shoulder and the annular body of the pivot cage.

7. The tandem wheel assembly of claim 6, further including:

an inboard thrust bearing disposed between the inboard flange and the inboard shoulder; and
an outboard thrust bearing disposed between the outboard flange and the outboard shoulder.

8. The tandem wheel assembly of claim 1, wherein each of the reaction bars is pivotally coupled to one of the gear trains and to the pivot cage by pin joints.

9. The tandem wheel assembly of claim 1, wherein the annular body of the pivot cage includes one or more upper openings through which the at least one chain extends and one or more lower openings through which the at least one chain extends.

10. The tandem wheel assembly of claim 9, wherein each of the reaction bars is pivotally attached to the pivot cage above the one or more upper openings.

11. The tandem wheel assembly of claim 1, wherein each wheel end gear train is a planetary set that includes a ring gear; and wherein the reaction bars are pivotally coupled to the ring gears.

12. The tandem wheel assembly of claim 1, wherein the center sprocket has dual chain rings; and wherein the at least one chain includes a first chain coupled between one wheel end sprocket and the center sprocket and a second chain coupled between the other wheel end sprocket and the center sprocket.

13. A tandem wheel assembly for a work vehicle having a chassis and wheels, the tandem wheel assembly comprising:

a tandem wheel housing having an inboard wall and an outboard wall both defining, at least in part, an interior, the inboard wall and the outboard wall both defining a center opening extending along a pivot axis and wheel end openings extending along associated wheel end axes, wherein the inboard wall defines an inboard shoulder and the outboard wall defines an outboard shoulder;

a pivot cage configured to fixedly mount to the chassis and disposed about the pivot axis at the center opening of the tandem wheel housing, the pivot cage having an annular body extending between an inboard end and an outboard end, the inboard wall and the outboard wall of the tandem wheel housing being pivotally mounted to the pivot cage at, respectively, the inboard end and the outboard end of the annular body;

a center sprocket disposed within and rotatable with respect to the pivot cage;

wheel end assemblies each disposed at one of the wheel end openings, each of the wheel end assemblies having a wheel end sprocket, a wheel end gear train, and a wheel end hub, each said wheel end sprocket being supported within the tandem wheel housing for rotation by at least one chain coupled to the center sprocket, each said wheel end gear train being coupled for rotation by the associated wheel end sprocket and configured to effect a gear ratio change and rotate the associated wheel end hub about the associated wheel end axis;

a pair of reaction bars, each of the reaction bars being pivotally coupled at one end to the annular body of the pivot cage and at an opposite end to a component of the associated wheel end gear train;

an inboard bushing disposed between the inboard shoulder and the annular body of the pivot cage; and an outboard bushing disposed between the outboard shoulder and the annular body of the pivot cage.

14. The tandem wheel assembly of claim 13, wherein the reaction bars extend within the interior of the tandem wheel housing.

15. The tandem wheel assembly of claim 14, wherein the reaction bars are pivotally coupled to the annular body between the inboard bushing and the outboard bushing; and
wherein one of the reaction bars is outboard of the other reaction bar.

16. The tandem wheel assembly of claim 15, wherein the pivot cage includes upper openings and lower openings; and
wherein the at least one chain includes a first chain coupled between one wheel end sprocket and the center sprocket and extending through a first of the upper openings and a first of the lower openings, and a second chain coupled between the other wheel end sprocket and the center sprocket and extending through a second of the upper openings and a second of the lower openings.

17. A tandem wheel assembly for a work vehicle having a chassis and wheels, the tandem wheel assembly comprising:
a tandem wheel housing having an inboard wall and an outboard wall both defining, at least in part, an interior, the inboard wall and the outboard wall both defining a center opening extending along a pivot axis and wheel end openings extending along associated wheel axes;
a pivot cage configured to fixedly mount to the chassis and disposed about the pivot axis at the center opening of the tandem wheel housing, the pivot cage having an annular body extending between an inboard end and an outboard end, the inboard wall and the outboard wall of the tandem wheel housing being pivotally mounted to the pivot cage at, respectively, the inboard end and the outboard end of the annular body;
a center sprocket disposed within and rotatable with respect to the pivot cage;
wheel end assemblies each disposed at one of the wheel end openings, each of the wheel end assemblies having a wheel end sprocket, a wheel end gear train, and a wheel end hub, each said wheel end sprocket being supported within the tandem wheel housing for rotation by at least one chain coupled to the center sprocket, each said wheel end gear train being coupled for rotation by the associated wheel end sprocket and configured to effect a gear ratio change and rotate the associated wheel end hub about the associated wheel end axis; and
reaction bars extending within the interior of the tandem wheel housing, each of the reaction bars being pivotally coupled at one end to the annular body of the pivot cage and at an opposite end to a component of the associated wheel end gear train;
wherein the annular body of the pivot cage has at least one opening therethrough between the inboard end and the outboard end through which the reaction bars extend.

18. The tandem wheel assembly of claim 17, wherein the inboard wall of the tandem wheel housing defines an inboard shoulder, an inboard bushing disposed between the inboard shoulder and the annular body of the pivot cage; and
wherein the outboard wall of the tandem wheel housing defines an outboard shoulder, an outboard bushing disposed between the outboard shoulder and the annular body of the pivot cage.

19. The tandem wheel assembly of claim 18, wherein the pivot cage includes an inboard flange at the inboard end of the annular body; and
further including at least one inboard seal disposed between the inboard flange and the inboard wall of the tandem wheel housing.

* * * * *